(12) United States Patent
Wu et al.

(10) Patent No.: US 11,789,866 B2
(45) Date of Patent: Oct. 17, 2023

(54) METHOD FOR PROCESSING NON-CACHE DATA WRITE REQUEST, CACHE, AND NODE

(71) Applicant: Huawei Technologies Co., Ltd., Shenzhen (CN)

(72) Inventors: Wenyu Wu, Shenzhen (CN); Jing Xia, Shenzhen (CN); Hengchao Xin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/749,612

(22) Filed: May 20, 2022

(65) Prior Publication Data

US 2022/0276960 A1 Sep. 1, 2022

Related U.S. Application Data

(63) Continuation of application No. PCT/CN2019/120252, filed on Nov. 22, 2019.

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | |
|---|---|---|
| 6,973,536 B1 | 12/2005 | Jacobs et al. |
| 7,099,913 B1 | 8/2006 | Bertone et al. |
| 2014/0032853 A1 | 1/2014 | Lih et al. |
| 2014/0089594 A1 | 3/2014 | Long |
| 2014/0181394 A1 | 6/2014 | Hum et al. |
| 2014/0258438 A1 | 9/2014 | Ayoub |
| 2015/0113317 A1 | 4/2015 | Ouyang et al. |
| 2015/0213105 A1 | 7/2015 | Fan |
| 2016/0062912 A1 | 3/2016 | Heideman et al. |
| 2017/0279918 A1 | 9/2017 | Honmura et al. |

FOREIGN PATENT DOCUMENTS

| | | |
|---|---|---|
| CN | 101409715 A | 4/2009 |
| CN | 102204218 A | 9/2011 |
| CN | 103649901 A | 3/2014 |

(Continued)

*Primary Examiner* — Gurtej Bansal
(74) *Attorney, Agent, or Firm* — Conley Rose, P.C.

(57) ABSTRACT

A method for processing a non-cache data write request includes a cache receiving a first non-cache data write request from a first processor, and sending the first non-cache data write request to a node, where the first non-cache data write request includes a first address. If the cache determines that the first address is stored in the cache, the cache obtains first data corresponding to the first non-cache data write request from the first processor. When receiving a first data buffer identifier from the node, the cache sends the first data to the node. After receiving the first non-cache data write request, if the cache determines that the first address is locally stored, the cache may obtain the first data from the processor. After receiving the first data buffer identifier, the cache may send the first data to the node.

20 Claims, 7 Drawing Sheets

(56) References Cited

FOREIGN PATENT DOCUMENTS

| | | | |
|---|---|---|---|
| CN | 103870204 | A | 6/2014 |
| CN | 105472023 | A | 4/2016 |
| CN | 108702374 | A | 10/2018 |
| CN | 110109889 | A | 8/2019 |
| WO | 2014056398 | A1 | 4/2014 |
| WO | 2017040706 | A1 | 3/2017 |
| WO | 2019211611 | A1 | 11/2019 |

METHOD FOR PROCESSING NON-CACHE DATA WRITE REQUEST, CACHE, AND NODE

CROSS-REFERENCE TO RELATED APPLICATIONS

This is a continuation of International Patent Application No. PCT/CN2019/120252 filed on Nov. 22, 2019, the disclosure of which is hereby incorporated by reference in its entirety.

TECHNICAL FIELD

This application relates to the cache field, and in particular, to a method for processing a non-cache data write request, a cache, and a node.

BACKGROUND

As a scale of a chipset becomes larger, costs of communication between chips become higher. In a multi-core and multi-chip system, each data write request requires interaction and a handshake. Typical application scenarios include a high-bit width operation using a same address and a low-bit width operation using a same address that are of remote direct memory access (RDMA). A complete data write operation needs to include the following steps:

When a central processing unit (CPU) needs to write data, the CPU may send a non-cache data write request to a node by using a cache. The node may write data corresponding to the non-cache data write request, or may send the data to a next subnode. The node may be a bus node or a controller. For example, the controller may be a storage controller, a universal serial bus (USB) controller, or the like. The node and a subnode may form a storage system. After the cache receives a first non-cache data write request sent by the CPU, the cache forwards the first non-cache data write request to the node. After the node receives the first non-cache data write request, the node allocates a data buffer identifier (data buffer ID, DBID) to the CPU, and sends the DBID to the CPU by using the cache. After receiving the DBID, the CPU sends, to the node by using the cache, first data that needs to be written. The node determines a data buffer corresponding to the DBID, and writes the first data into the data buffer. After writing the data, the node sends a completion (COMP) response to the CPU by using the cache.

The cache can request, based on the DBID, the first data corresponding to the first non-cache data write request from the CPU only after receiving the DBID sent by the node. After receiving the first data, the cache sends the first data to the node. Therefore, data writing efficiency is low.

SUMMARY

This application provides a method for processing a non-cache data write request, and a cache. In the method for processing a non-cache data write request, a cache may obtain first data from a processor without waiting to receive a first data buffer identifier sent by a node. After receiving the first data buffer identifier from the node, the cache may immediately send the first data to the node. This can accelerate a data write process.

In view of this, a first aspect of this application provides a method for processing a non-cache data write request. The method includes: A cache receives a first non-cache data write request from a first processor, and sends the first non-cache data write request to a node, where the first non-cache data write request includes a first address, and the first non-cache data write request is used to apply to the node for a first data buffer identifier corresponding to the first address. If the cache determines that the first address is stored in the cache, the cache obtains first data corresponding to the first non-cache data write request from the first processor. When receiving the first data buffer identifier from the node, the cache sends the first data to the node. After receiving the first non-cache data write request, if the cache determines that the first address is locally stored, the cache may immediately obtain the first data from the first processor, and does not need to wait until it receives the first data buffer identifier allocated by the node before requesting the first data from the first processor. After receiving the first data buffer identifier, the cache may immediately send the first data to the node. This can improve data writing efficiency and accelerate the data write process.

Optionally, with reference to the first aspect, in a first possible implementation of the first aspect, that the cache obtains first data corresponding to the first non-cache data write request from the first processor includes: The cache sends a second data buffer identifier to the first processor, to indicate the first processor to send the first data to the cache, where the second data buffer identifier is allocated by the cache to the first processor based on the first non-cache data write request. The cache receives the first data from the first processor. Because the first processor does not know which device allocates the data buffer identifier, the cache may allocate the second data buffer identifier to the first processor to indicate the first processor to send the first data, so that the first processor may send the first data in advance. This accelerates the data write process.

Optionally, with reference to the first possible implementation of the first aspect, in a second possible implementation of the first aspect, the method further includes: The cache determines that the first address stored in the cache is marked with an exclusive flag. The cache sends a first completion response to the first processor, to indicate the first processor to release a buffer occupied by the first data. When determining that the first address is marked with the exclusive flag, the cache may send the first completion response to the first processor while sending the second data buffer identifier to the first processor. After sending the first data, the first processor may immediately release the buffer occupied by the first data. This can relieve burden on the first processor. If the first processor needs to continuously write data, the first processor may immediately send a next non-cache data write request after receiving the first completion response. This can improve data writing efficiency.

Optionally, with reference to the second possible implementation of the first aspect, in a third possible implementation of the first aspect, before that a cache receives a first non-cache data write request from a first processor, the method further includes: The cache receives a second non-cache data write request from a second processor, and sends the second non-cache data write request to the node, where the second non-cache data write request includes the first address, and the first address is used by the node to determine whether the first address stored in the cache is marked with the exclusive flag. The cache receives a third data buffer identifier and a second completion response from the node, where the second completion response includes the exclusive flag. If the first address stored in the cache is not marked with the exclusive flag, the cache marks the first address with the exclusive flag. When the first address stored in the cache is not marked with the exclusive flag, the cache may request the node for the exclusive flag, and mark the first address with the exclusive flag. After marking the first address with the exclusive flag, the cache may directly send the completion response to the processor.

Optionally, with reference to the second or the third possible implementation of the first aspect, in a fourth possible implementation of the first aspect, the method further includes: The cache receives a deletion instruction from the node. The cache deletes the exclusive flag of the first address, and sends a deletion confirmation instruction to the node. After receiving the deletion instruction, the cache may delete the exclusive flag of the first address, and send the deletion instruction to the node. The node may delete a correspondence between the cache and the first address according to the deletion instruction. The node may record a correspondence between another cache and the first address. Therefore, diversity of the solution can be improved.

A second aspect of this application provides a method for processing a non-cache data write request, where the method includes: A node receives a first non-cache data write request from a first cache, where the first non-cache data write request includes a first address. The node allocates a first data buffer identifier to a first processor based on the first non-cache data write request, and sends the first data buffer identifier to the first cache. When receiving first data corresponding to the first non-cache data write request from the first cache, the node writes the first data into a data buffer corresponding to the first data buffer identifier, where the first data is obtained from the first processor when the first cache determines that the first address is stored in the first cache. After receiving the first non-cache data write request, if the first cache determines that the first address is locally stored, the first cache may immediately obtain the first data from the first processor. The first cache does not need to wait until it receives the first data buffer identifier allocated by the node before requesting the first data from the first processor. When receiving the first data buffer identifier, the cache may directly send the first data to the node. After receiving the first data, the node may write, based on the first data buffer identifier, the first data into a data buffer corresponding to the first data buffer identifier. This can improve data writing efficiency and accelerate a data write process.

Optionally, with reference to the second aspect, in a first possible implementation of the second aspect, after that a node receives a first non-cache data write request from a first cache, the method further includes: The node determines that a correspondence between an identifier of the first cache and the first address is stored, where the correspondence indicates that the first address stored in the cache is marked with an exclusive flag. When the first address stored in the first cache is marked with the exclusive flag, the first cache may allocate a second data buffer identifier to the first processor to indicate the first processor to send the first data, so that the first processor may send the first data in advance. This accelerates the data write process.

Optionally, with reference to the first possible implementation of the second aspect, in a second possible implementation of the second aspect, before that a node receives a first non-cache data write request from a first cache, the method further includes: The node receives a second non-cache data write request from the first cache, where the second non-cache data write request includes the first address. The node stores the correspondence between the identifier of the first cache and the first address. The node allocates a third data buffer identifier based on the second non-cache data write request, and sends the third data buffer identifier and a second completion response to the first cache, where the second completion response includes the exclusive flag. The node may send the second completion response including the exclusive flag to the first cache, and after receiving the second completion response, the first cache may mark the locally stored first address with the exclusive flag. Then, the first cache may send the first completion response to the first processor while sending the second data buffer identifier to the first processor. After sending the first data, the first processor may immediately release the buffer occupied by the first data. This can relieve burden on the first processor. If the first processor needs to continuously write data, the first processor may immediately send a next non-cache data write request after receiving the first completion response. This can improve data writing efficiency.

Optionally, with reference to the first or the second possible implementation of the second aspect, in a third possible implementation of the second aspect, the method further includes: The node receives a third non-cache data write request from a second cache, where the third non-cache data write request includes the first address, and the second cache is different from the first cache. If the first cache determines that the node stores the correspondence between the identifier of the first cache and the first address, the node sends a deletion instruction to the first cache, where the deletion instruction instructs the first cache to delete the exclusive flag of the first address and send a deletion confirmation instruction to the node. The node receives the deletion confirmation instruction from the first cache. The node deletes the correspondence between the identifier of the first cache and the first address according to the deletion confirmation instruction. When receiving the third non-cache data write request from the second cache, the node may first delete the correspondence between the identifier of the first cache and the first address, and then record a correspondence between an identifier of the second cache and the first address, so that diversity of the solution can be improved.

A third aspect of this application provides a cache, where the cache includes: a management module, configured to: receive a first non-cache data write request from a first processor, and send the first non-cache data write request to a node, where the first non-cache data write request includes a first address, and the first non-cache data write request is used to apply to the node for a first data buffer identifier corresponding to the first address; a data processing module, configured to: when a flag storage module determines that the first address is stored, obtain first data corresponding to the first non-cache data write request from the first processor, where the data processing module is further configured to: when a data buffer identifier receiving module receives the first data buffer identifier, send the first data to the node. After the management module receives the first non-cache data write request, if the flag storage module determines that the first address is locally stored, the data processing module may immediately obtain the first data from the first processor. After the data buffer identifier receiving module receives the first data buffer identifier, the data processing module may immediately send the first data to the node. This can improve data writing efficiency and accelerate the data write process.

Optionally, with reference to the third aspect, in a first possible implementation of the third aspect, the cache further includes: the management module, further configured to send a second data buffer identifier to the first processor, to indicate the first processor to send the first data to the cache;

and the data processing module, further configured to receive the first data from the first processor.

Optionally, with reference to the first possible implementation of the third aspect, in a second possible implementation of the third aspect, the flag storage module is configured to determine that the first address is marked with an exclusive flag. The management module is further configured to send a first completion response to the first processor, to indicate the first processor to release a buffer occupied by the first data.

Optionally, with reference to the second possible implementation of the third aspect, in a third possible implementation of the third aspect, the management module is further configured to: receive a second non-cache data write request from a second processor, and send the second non-cache data write request to the node, where the second non-cache data write request includes the first address, and the first address is used by the node to determine whether the first address stored in the cache is marked with the exclusive flag. The data buffer identifier receiving module is configured to receive a third data buffer identifier from the node. The flag storage module is further configured to receive the second completion response from the node, where the second completion response includes the exclusive flag. The flag storage module is further configured to: when the first address stored in the flag storage module does not have the exclusive flag, mark the first address with the exclusive flag.

Optionally, with reference to the second or the third possible implementation of the third aspect, in a fourth possible implementation of the third aspect, the flag storage module is further configured to receive a deletion instruction from the node. The flag storage module is further configured to: delete the exclusive flag of the first address, and send a deletion confirmation instruction to the node.

A fourth aspect of this application provides a node, where the node includes: a request processing module, configured to receive a first non-cache data write request from a first cache, where the first non-cache data write request includes a first address; and a data buffering module, configured to: allocate a first data buffer identifier to a first processor based on the first non-cache data write request received by the request processing module, and indicate a management module to send the first data buffer identifier to the first cache. The data buffering module is further configured to: when a data processing module receives first data corresponding to the first non-cache data write request, write the first data into a data buffer corresponding to the first data buffer identifier, where the first data is obtained from the first processor when the first cache determines that the first address is stored in the first cache. After receiving the first non-cache data write request, if the first cache determines that the first address is locally stored, the first cache may immediately obtain the first data from the first processor. The first cache does not need to wait until it receives the first data buffer identifier allocated by the node before requesting the first data from the first processor. When receiving the first data buffer identifier, the cache may directly send the first data to the node. After receiving the first data, the node may write, based on the first data buffer identifier, the first data into a data buffer corresponding to the first data buffer identifier. This can improve data writing efficiency and accelerate a data write process.

Optionally, with reference to the fourth aspect, in a first possible implementation of the fourth aspect, the management module is further configured to determine that a correspondence between an identifier of the first cache and the first address is stored, where the correspondence indicates that the first address stored in the cache is marked with an exclusive flag.

Optionally, with reference to the first possible implementation of the fourth aspect, in a second possible implementation of the fourth aspect, the request processing module is further configured to receive a second non-cache data write request from the first cache, where the second non-cache data write request includes the first address. The management module is further configured to store the correspondence between the identifier of the first cache and the first address. The data buffering module is further configured to allocate a third data buffer identifier based on the second non-cache data write request received by the request processing module. The management module is further configured to send the third data buffer identifier and a second completion response to the first cache, where the second completion response includes the exclusive flag.

Optionally, with reference to the first or the second possible implementation of the fourth aspect, in a third possible implementation of the fourth aspect, the request processing module is further configured to receive a third non-cache data write request from a second cache, where the third non-cache data write request includes the first address, and the second cache is different from the first cache. The management module is further configured to: when determining that the correspondence between the identifier of the first cache and the first address is stored, send a deletion instruction to the first cache, where the deletion instruction instructs the first cache to delete the exclusive flag of the first address and send a deletion confirmation instruction to the node. The management module is further configured to receive the deletion confirmation instruction from the first cache. The management module is further configured to delete the stored correspondence between the identifier of the first cache and the first address according to the deletion confirmation instruction.

This application provides a method for processing a non-cache data write request. The method includes: A cache receives a first non-cache data write request from a first processor, and sends the first non-cache data write request to a node, where the first non-cache data write request includes a first address, and the first non-cache data write request is used to apply to the node for a first data buffer identifier corresponding to the first address. If the cache determines that the first address is stored in the cache, the cache obtains first data corresponding to the first non-cache data write request from the first processor. When receiving the first data buffer identifier from the node, the cache sends the first data to the node. After receiving the first non-cache data write request, if the cache determines that the first address is locally stored, the cache may immediately obtain the first data from the processor, and does not need to wait until it receives the first data buffer identifier before requesting the first data from the processor. After receiving the first data buffer identifier, the cache may immediately send the first data to the node. This can improve data writing efficiency and accelerate the data write process.

DESCRIPTION OF EMBODIMENTS

The following clearly describes the technical solutions in embodiments of the present application with reference to the accompanying drawings in embodiments of the present application. It is clearly that the described embodiments are merely some rather than all of embodiments of the present application. All other embodiments obtained by persons skilled in the art based on embodiments of the present application without creative efforts shall fall within the protection scope of the present application.

In the specification, claims, and the accompanying drawings of this application, the terms "first", "second", and the like are intended to distinguish between similar objects but do not necessarily indicate a specific order or sequence. It should be understood that the data used in such a way are interchangeable in proper cases, so that embodiments described herein can be implemented in an order other than the order illustrated or described herein. Moreover, terms "include", "have", and any other variant thereof are intended to cover non-exclusive inclusion. For example, a process, a method, a system, a product, or a device that includes a series of steps or modules is not necessarily limited to those expressly listed steps or modules, but may include other steps or modules not expressly listed or inherent to the process, the method, the system, the product, or the device.

As a scale of a chipset becomes larger, costs of communication between chips become higher. In a multi-core and multi-chip system, each non-cache data write request requires interaction and a handshake. In a high-performance processor architecture, typical application scenarios include a high-bit width operation, for example, a work queue element (WQE), using a same address, and a low-bit width operation, for example, a doorbell task, using a same address that are performed in sequence.

Figure 1:
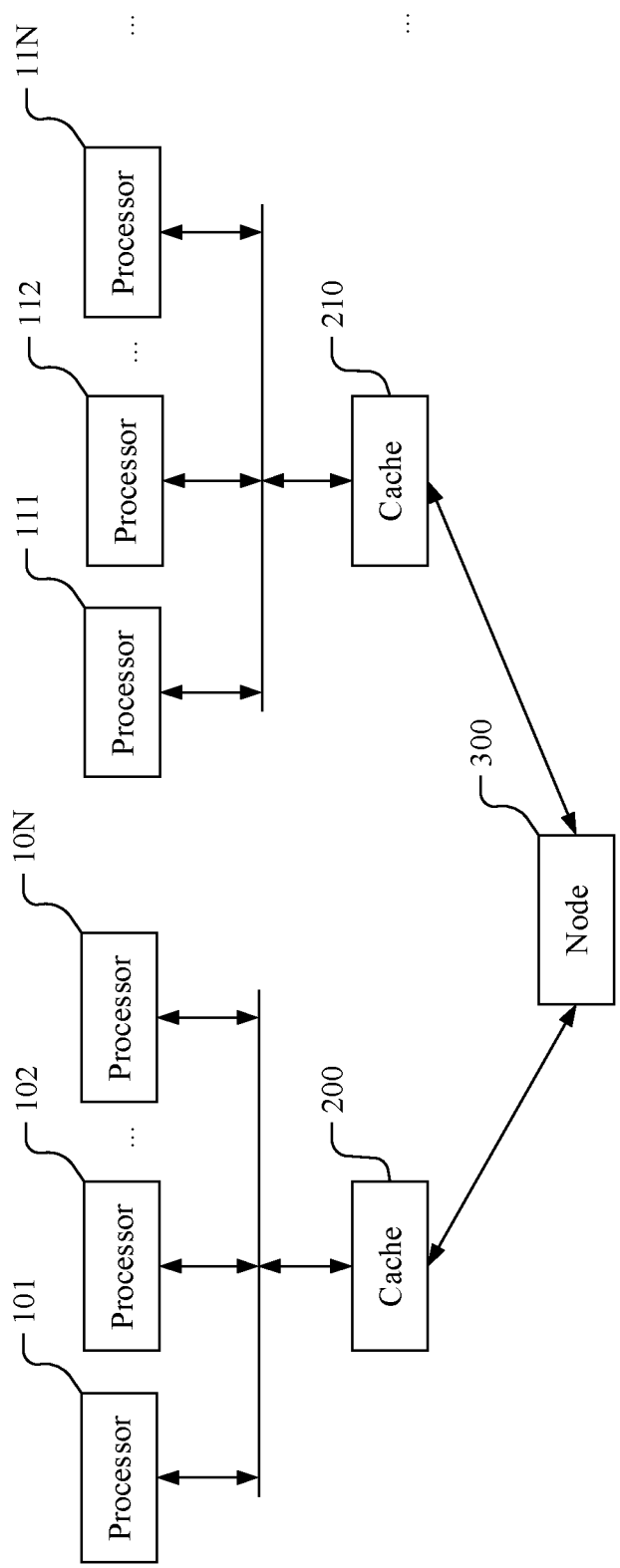
FIG. 1 is a schematic diagram of an embodiment of an information processing system according to this application.

FIG. 1 shows an information processing system according to this application. The system includes a plurality of caches. Each cache, for example, a cache 200, a cache 210, . . . , or the like shown in FIG. 1, has a different identifier, and each cache manages one or more processors. For example, the cache 200 manages a processor 101, a processor 102, . . . , and a processor 10N. The N processors may be connected by using a system bus. All the N processors managed by the cache 200 may interact with the cache 200.

Figure 2:
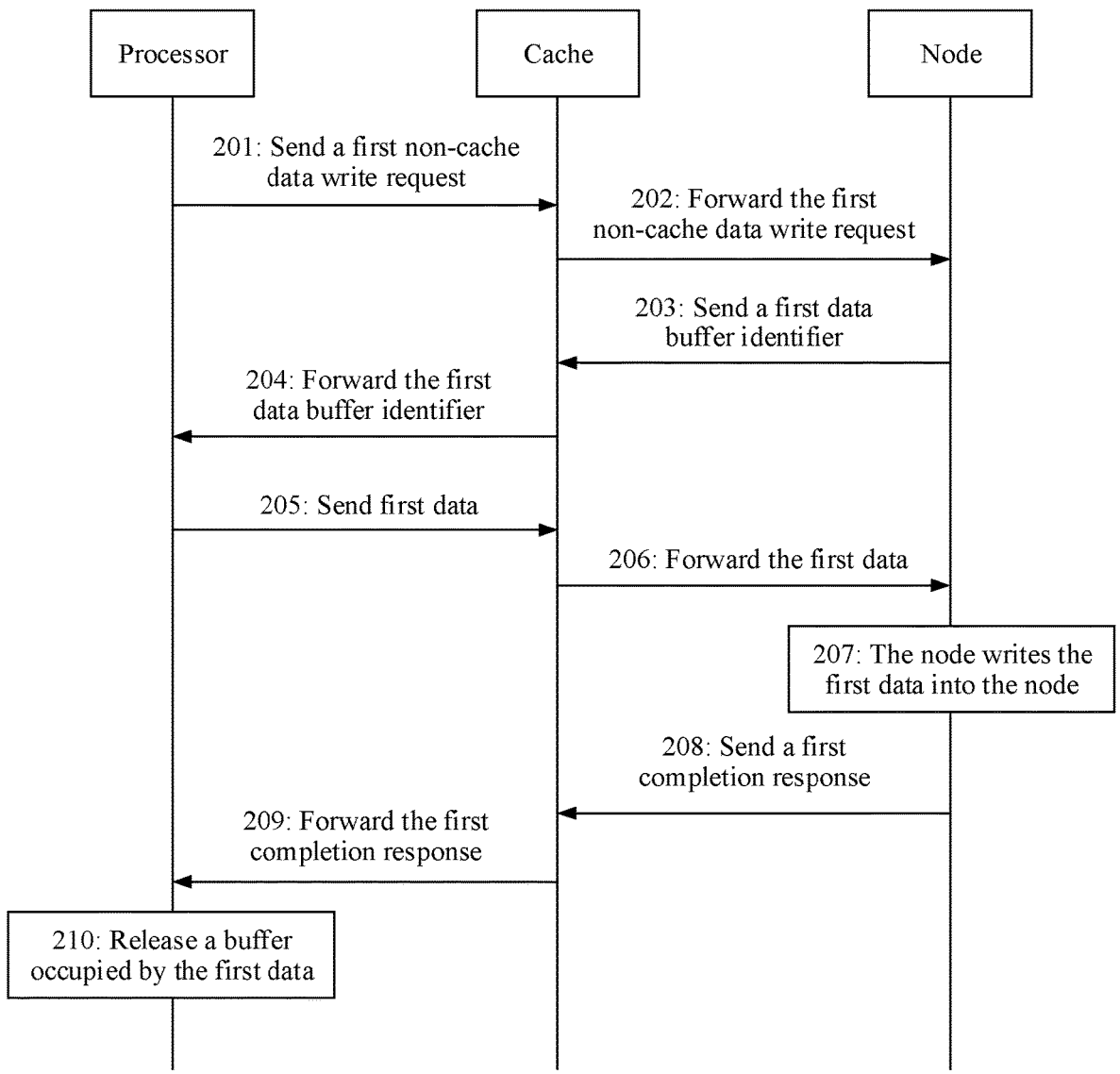
FIG. 2 is a schematic diagram of an embodiment of a method for processing a non-cache data write request according to this application.

Refer to FIG. 2. When a processor managed by a cache needs to write data, the processor sends a first non-cache data write request in step 201. When the cache receives the first non-cache data write request, the cache forwards the first non-cache data write request in step 202. After receiving the first non-cache data write request, a node allocates a first data buffer identifier based on the first non-cache data write request. The node sends the first data buffer identifier in step 203. After receiving the first data buffer identifier, the cache forwards the first data buffer identifier in step 204. When the processor receives the first data buffer identifier, the processor sends first data in step 205. When receiving the first data, the cache forwards the first data in step 206. After receiving the first data, the node writes the first data into the node in step 207. After writing the first data, the node sends a first completion response in step 208. After receiving the first completion response, the cache forwards the first completion response in step 209. When receiving the first completion response, the processor releases a buffer occupied by the first data in step 210.

After receiving the first data buffer identifier sent by the node, the cache can request the first data corresponding to the first non-cache data write request from the processor based on the first data buffer identifier. After receiving the first data, the cache sends the first data to the node. Therefore, data writing efficiency is low.

It should be noted that, in FIG. 1, N processors managed by any cache and the cache are located on a same chip, and source addresses of non-cache data write requests sent by any one of N processors managed by a same cache are the same. The cache and the node may be located on a same chip or different chips. When the cache and the node are located on different chips, a protocol adapter (PA) may further exist between the cache and the node. When receiving a non-cache data write request of any processor, the cache needs to first send the non-cache data write request to a source PA located on a same chip as the cache, the source PA forwards the non-cache data write request to a destination PA located on a same chip as the node, and the destination PA forwards the non-cache data write request to the node.

It should be noted that, the non-cache data write request includes an attribute of data that needs to be written, an address of a destination that needs to be written, and other basic information. In a process in which the node writes the data that needs to be written, the non-cache data write request is necessary.

Figure 3:
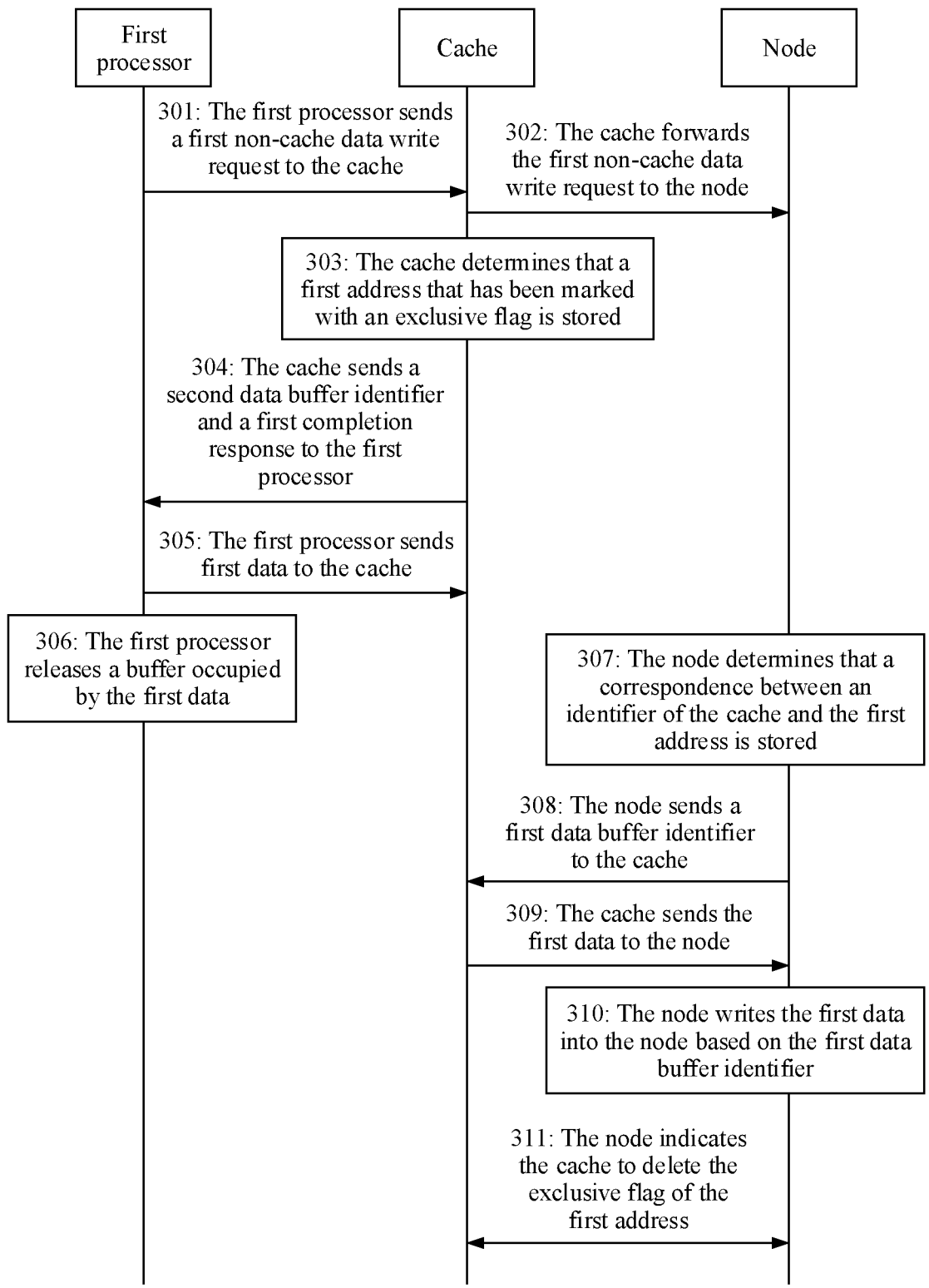
FIG. 3 is a schematic diagram of an embodiment of a method for processing a non-cache data write request according to this application.

An embodiment of this application provides a method for processing a non-cache data write request. Refer to FIG. 3. Specifically, the method for processing a data write request includes the following steps.

301: A first processor sends a first non-cache data write request to a cache.

When needing to write data, the first processor sends the first non-cache data write request to the cache. The first processor is any one of processors managed by the cache. The cache receives the first non-cache data write request from the first processor. The first non-cache data write request includes a first address, the first address points to a segment of data buffering areas of a node, the data buffering area includes a plurality of data buffers, and each data buffer has a data buffer identifier. The first non-cache data write request is used to apply to the node for a data buffer in the data buffering area.

302: The cache forwards the first non-cache data write request to the node.

The cache forwards the first non-cache data write request to the node.

303: The cache determines that the first address that has been marked with an exclusive flag is stored.

The cache determines that the first address is locally stored, and the first address is marked with the exclusive flag.

It should be noted that, the MESI protocol defines modified, exclusive, shared, and invalid states. This solution uses the MESI protocol for reference. In this solution, a cache line in the cache is only in an exclusive state or an invalid state for the first address in the node. When a state is exclusive, data in the cache is clean, that is, the data in the cache is consistent with data in the node.

A state of the cache line in the cache is the exclusive state for the first address only after the cache receives the exclusive flag of the node. The first address can be exclusively occupied by a cache line of only one cache at one moment. When determining that the first address marked with the exclusive flag is stored and when receiving a non-cache data write request including the first address from any processor, the cache may directly send a data buffer identifier and a completion response to the processor, so that the processor can immediately release, after sending data corresponding to the data write request, a buffer occupied by the data.

304: The cache sends a second data buffer identifier and a first completion response to the first processor.

In step 303, when determining that the first address is locally stored, the cache sends the second data buffer identifier to the first processor, where the second data buffer identifier is allocated by the cache to the first processor. The second data buffer identifier indicates the first processor to send first data corresponding to the first non-cache data write request to the cache.

If the cache determines that the first address locally stored in the cache is marked with the exclusive flag, the cache may send the first completion response to the first processor while sending the second data buffer identifier to the first processor, where the first completion response indicates the first processor to release, after sending the first data to the cache, a buffer occupied by the first data.

It should be noted that, the second data buffer identifier is allocated by the cache, and the processor does not know which device allocates the data buffer identifier.

305: The first processor sends the first data to the cache.

After receiving the second data buffer identifier sent by the cache in step 304, the first processor sends the first data to the cache.

306: The first processor releases the buffer occupied by the first data.

If the first processor also receives the first completion response when receiving the second data buffer identifier, after sending the first data to the cache in step 305, the first processor may immediately release the buffer occupied by the first data.

307: The node determines that a correspondence between an identifier of the cache and the first address is stored.

The node determines, in a local directory of the node, that the correspondence between the identifier of the cache and the first address is stored. When determining that the correspondence between the cache and the first address is stored in the directory, the node may determine that the first address stored in the cache is marked with the exclusive flag.

It should be noted that step 307 is performed after step 302, but step 307 and step 303 to step 306 are not subject to a specific sequence.

308: The node sends a first data buffer identifier to the cache.

After determining that the correspondence between the identifier of the cache and the first address is stored in the directory, the node allocates the first data buffer identifier to the first processor based on the first non-cache data write request sent by the cache in step 302. The node sends the first data buffer identifier to the cache.

When sending the first data buffer identifier to the cache, the node may also send a completion response to the cache, where the completion response may carry the exclusive flag.

309: The cache sends the first data to the node.

When receiving the first data buffer identifier from the node, the cache sends the first data received from the first processor to the node.

310: The node writes the first data into the node based on the first data buffer identifier.

The node writes the first data into the node based on the first data buffer identifier. Specifically, the node determines, based on the first data buffer identifier, a data buffer corresponding to the first data buffer identifier in the node, and then writes the first data into the data buffer.

311: The node indicates the cache to delete the exclusive flag of the first address.

Optionally, the node may indicate the cache to delete the exclusive flag of the first address.

Figure 4:
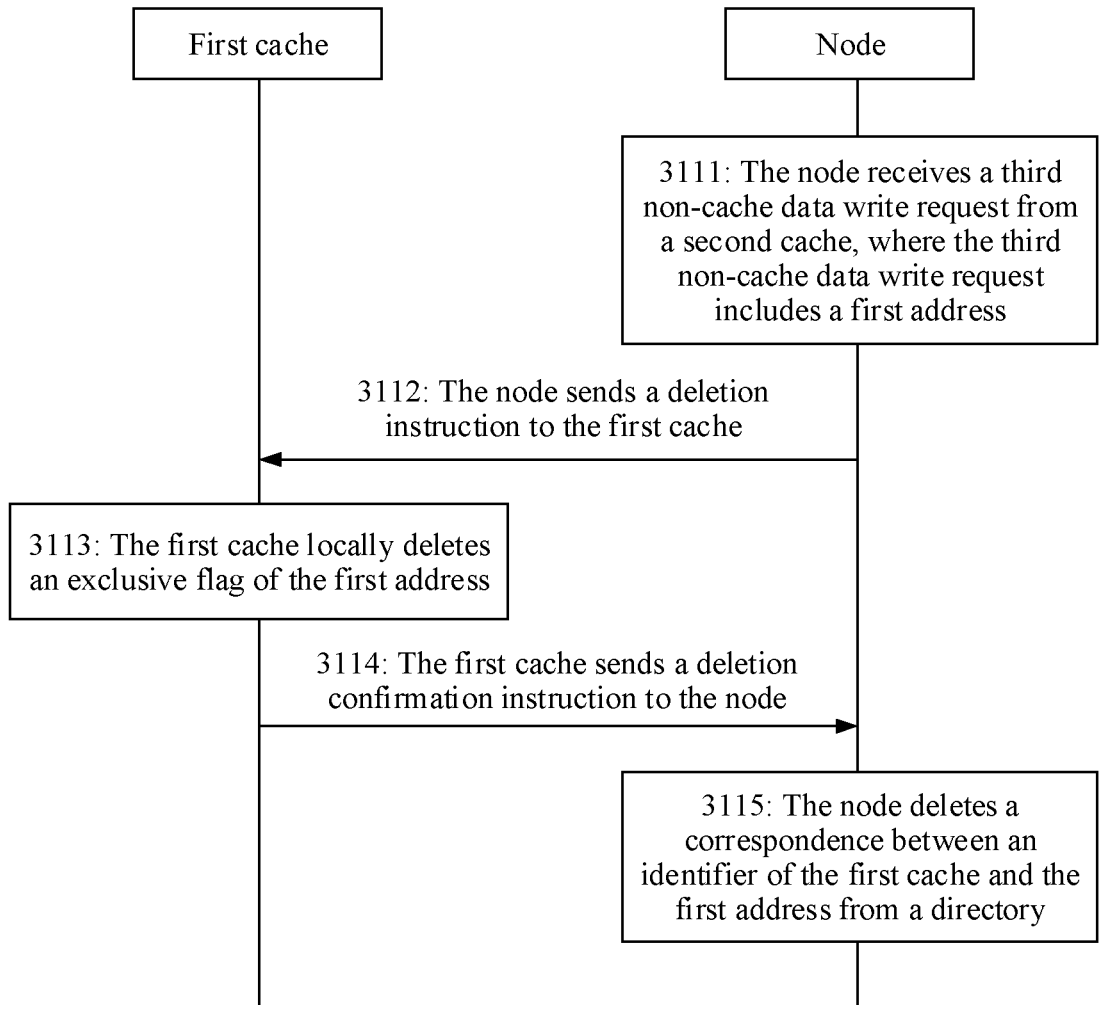
FIG. 4 is a schematic diagram of an embodiment of a method for processing a non-cache data write request according to this application.

Specifically, refer to FIG. 4. A first cache in step 3111 to step 3115 in FIG. 4 is the cache in step 301 to step 311 in FIG. 3. A specific implementation of indicating, by the node, the cache to delete the locally recorded target flag may be as follows.

3111: The node receives a third non-cache data write request from a second cache, where the third non-cache data write request includes the first address.

The node receives the third non-cache data write request from the second cache, where the second cache is different from the first cache. An identifier of the second cache is different from an identifier of the first cache. The third non-cache data write request includes the first address.

3112: The node sends a deletion instruction to the first cache.

When determining that a correspondence between the first cache and the first address is stored in the directory, the node sends the deletion instruction to the first cache, where the deletion instruction instructs the first cache to delete the exclusive flag of the first address.

3113: The first cache locally deletes the exclusive flag of the first address.

The first cache deletes the exclusive flag of the first address.

3114: The first cache sends a deletion confirmation instruction to the node.

The first cache sends the deletion confirmation instruction to the node, where the deletion confirmation instruction instructs the node to delete the correspondence that is between the identifier of the first cache and the first address and that is stored in the node.

3115: The node deletes the correspondence between the identifier of the first cache and the first address from the directory.

After receiving the deletion confirmation instruction, the node deletes the correspondence between the identifier of the first cache and the first address from the local directory. The node stores a correspondence between the identifier of the second cache and the first address.

It may be understood that the node may further send a data buffer identifier and a completion response to the second cache, where the completion response indicates the second cache to mark the locally stored first address with the exclusive flag.

The embodiment of this application provides the method for processing a non-cache data write request. After receiving the first non-cache data write request, if the cache determines that the first address is locally stored, the cache may immediately obtain the first data from the processor, and does not need to wait until it receives the first data buffer identifier before requesting the first data from the processor. After receiving the first data buffer identifier, the cache may immediately send the first data to the node. This can improve data writing efficiency and accelerate a data write process.

In addition, when determining that the locally stored first address is marked with the exclusive flag, the cache sends the first completion response to the first processor. After sending the first data, the first processor may immediately release the buffer occupied by the first data. This can relieve burden on the first processor. If the first processor needs to continuously write data, after sending the first data, the first processor may immediately send a next non-cache data write request. This accelerates the data write process.

Figure 5:
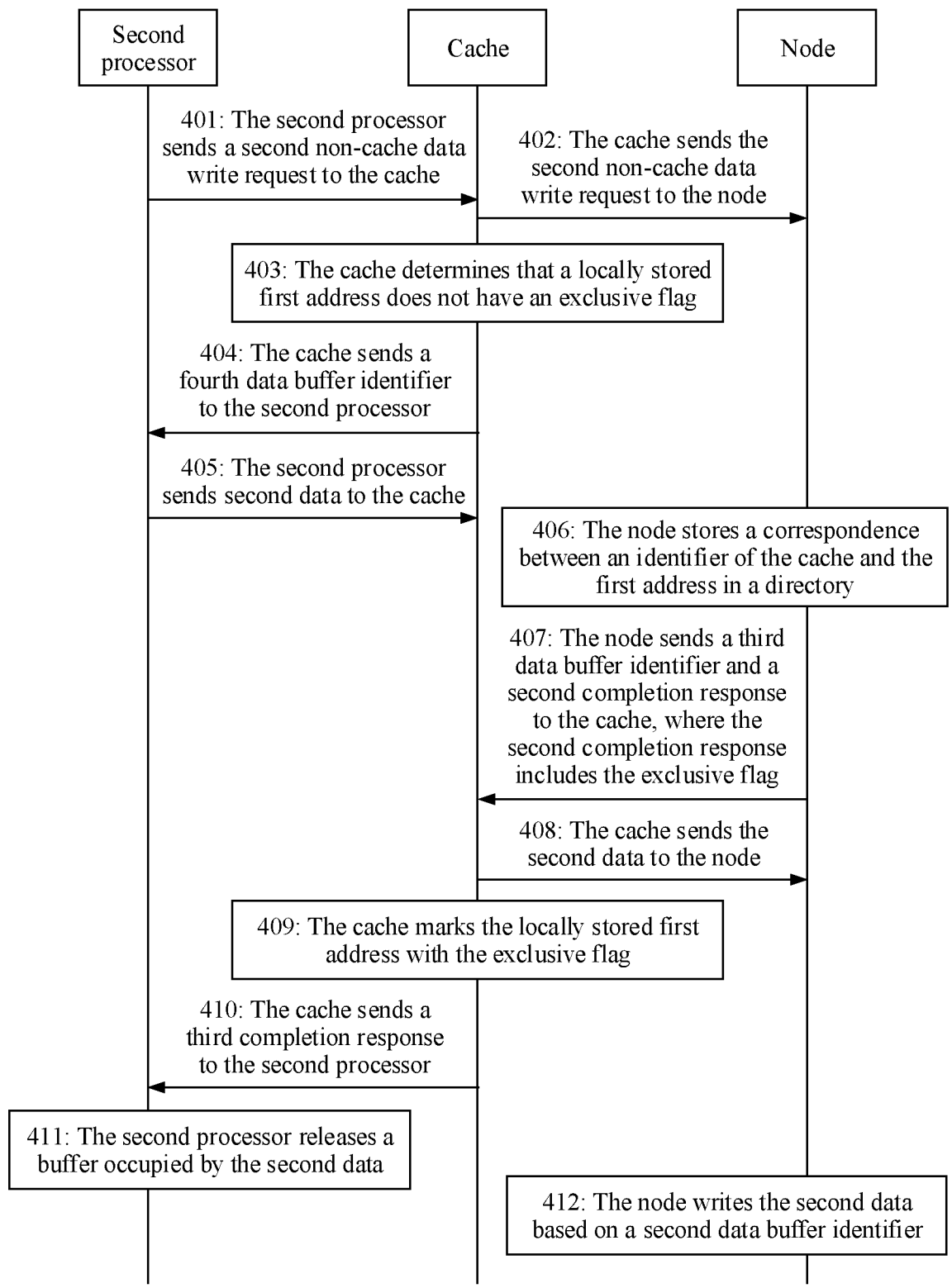
FIG. 5 is a schematic diagram of an embodiment of a method for processing a non-cache data write request according to this application.

In the foregoing step 303, the cache needs to determine that the first address that has been marked with the exclusive flag is locally stored. Before step 303, the cache needs to first obtain the exclusive flag from the node, and mark the locally stored first address with the exclusive flag. Refer to FIG. 5. Before step 301 of the method for processing a non-cache data write request, the method further includes the following steps.

401: A second processor sends a second non-cache data write request to the cache.

The second processor sends the second non-cache data write request to the cache, where the second non-cache data write request includes the first address. The second processor and the first processor may be a same processor or different processors. If the first processor is different from the second processor, both of the first processor and the second processor are processors managed by the cache.

It should be noted that, after receiving the non-cache data write request including the first address for the first time, the cache locally stores the first address.

402: The cache sends the second non-cache data write request to the node.

The cache sends the second non-cache data write request to the node.

403: The cache determines that the locally stored first address does not have the exclusive flag.

The cache determines that the locally stored first address is not marked with the exclusive flag.

404: The cache sends a fourth data buffer identifier to the second processor.

The cache sends the fourth data buffer identifier to the second processor, where the fourth data buffer identifier is allocated by the cache to the second processor based on the second non-cache data write request.

It should be noted that, when determining, that the locally stored first address is not marked with the exclusive flag in step 403, the cache can only send the fourth data buffer identifier to the second processor, but cannot send a completion response to the second processor.

405: The second processor sends second data to the cache.

After receiving the fourth data buffer identifier, the second processor sends the second data corresponding to the second non-cache data write request to the cache.

406: The node stores the correspondence between the identifier of the cache and the first address in the directory.

In step 402, after receiving the second non-cache data write request sent by the cache, when determining that a correspondence about the first node is not stored in the directory, the node stores the correspondence between the identifier of the cache and the first address in the directory.

It should be noted that, after receiving the second non-cache data write request, if the node determines that a correspondence between an identifier of another cache and the first address is stored in the directory, the node needs to first delete the correspondence between the identifier of the another cache and the first address, and then record the correspondence between the identifier of the cache and the first address. For details, refer to step 3111 to step 3115, and details are not described herein again.

Step 406 is performed after step 402, but step 405 and step 403 to step 405 are not subject to a specific sequence.

407: The node sends a third data buffer identifier and a second completion response to the cache, where the second completion response includes the exclusive flag.

After storing the correspondence between the identifier of the cache and the first address in the directory, the node allocates the third data buffer identifier to the second processor based on the second non-cache data write request, and sends the third data buffer identifier and the second completion response that carries the exclusive flag to the cache. For example, the exclusive flag is a character carried in the completion response.

408: The cache sends the second data to the node.

After receiving the third data buffer identifier and the second completion response, the cache sends the second data to the node.

409: The cache marks the locally stored first address with the exclusive flag.

The cache marks the locally stored first address with the exclusive flag. For example, if the exclusive flag is the character, the cache adds the character to the end of the locally stored first address, to identify exclusive permission of the cache on the first address.

410: The cache sends a third completion response to the second processor.

After marking the locally stored first address with the exclusive flag, the cache sends the third completion response to the second processor, where the third completion response indicates the second processor to release a buffer occupied by the second data.

411: The second processor releases the buffer occupied by the second data.

After receiving the third completion response, the second processor may release the buffer occupied by the second data.

412: The node writes the second data based on the second data buffer identifier.

After receiving the second data, the node writes the second data into the data buffer corresponding to the second data. Step 412 is performed after step 408, and step 412 and step 409 to step 411 are not subject to a specific sequence.

This embodiment of this application provides the method for processing a non-cache data write request. In the method, the cache may apply to the node for the exclusive flag of the first address, and then mark the locally stored first address with the exclusive flag. Therefore, after receiving the non-cache data write request of the processor, the cache may directly send a data buffer identifier and a completion response to the processor, to indicate the processor to send data corresponding to the non-cache data write request and release a buffer occupied by the data. This can relieve burden on the processor. When the processor needs to continuously write data, after sending the data, the processor may immediately send a next non-cache data write request. This accelerates a data write process.

Figure 6:
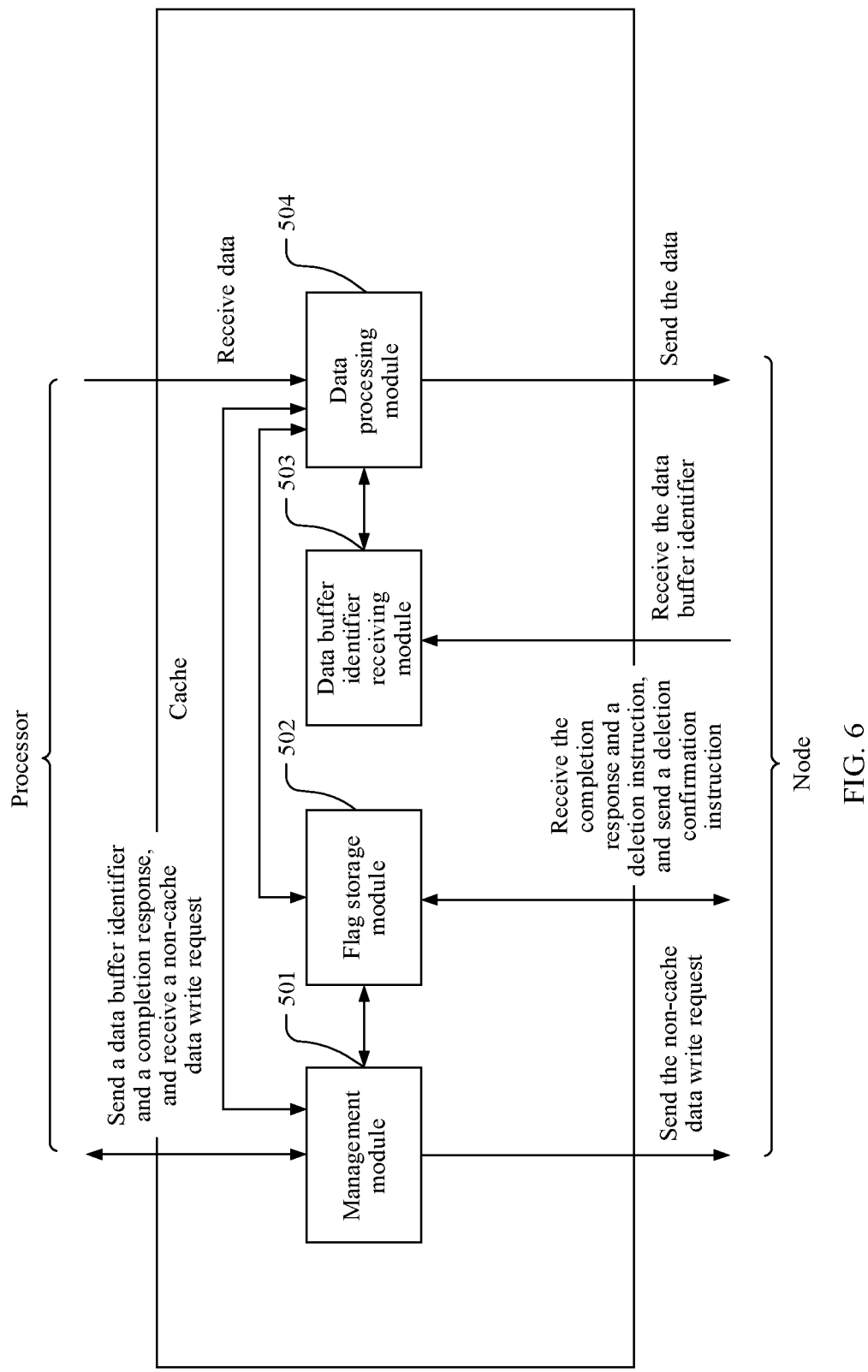
FIG. 6 is a schematic diagram of an embodiment of a cache according to this application.

An embodiment of this application provides a cache. Refer to FIG. 6. The cache includes a management module 501, a flag storage module 502, a data buffer identifier receiving module 503, and a data processing module 504.

The management module 501 is configured to: send a data buffer identifier and a completion response to the processor, receive a non-cache data write request from the processor, and send the non-cache data write request to a node. The management module 501 interworks with the flag storage module 502. The flag storage module 502 is configured to receive the completion response and a deletion instruction, and is further configured to send a deletion confirmation instruction to the node.

The data buffer identifier receiving module 503 is configured to receive the data buffer identifier from the node. The data processing module 504 interworks with the data buffer identifier receiving module 503, the management module 501, and the flag storage module 502. The data processing module 504 is configured to receive data from the processor and send the data to the node.

Specifically, functions of the modules in the cache are specifically as follows.

The management module 501 is configured to: receive a first non-cache data write request from a first processor, and send the first non-cache data write request to the node, where the first non-cache data write request includes a first address, and the first non-cache data write request is used to apply to the node for a first data buffer identifier corresponding to the first address.

The management module 501 is further configured to send a second data buffer identifier to the first processor, to indicate the first processor to send first data to the cache.

The management module 501 is further configured to send a first completion response to the first processor, to indicate the first processor to release a buffer occupied by the first data.

The management module 501 is further configured to: receive a second non-cache data write request from a second processor, and send the second non-cache data write request to the node, where the second non-cache data write request includes the first address, and the first address is used by the node to determine whether the first address stored in the cache is marked with an exclusive flag.

The flag storage module 502 is configured to determine that the first address is marked with the exclusive flag.

The flag storage module 502 is further configured to receive a second completion response from the node, where the second completion response includes the exclusive flag.

The flag storage module 502 is further configured to: when the first address stored in the flag storage module 502 is not marked with the exclusive flag, mark the first address with the exclusive flag.

The flag storage module 502 is further configured to receive a deletion instruction from the node.

The flag storage module 502 is further configured to: delete the exclusive flag of the first address, and send a deletion confirmation instruction to the node.

The data buffer identifier receiving module 503 is configured to receive a third data buffer identifier from the node.

The data processing module 504 is configured to: when the flag storage module 502 determines that the first address is stored, obtain the first data corresponding to the first non-cache data write request from the first processor.

The data processing module 504 is further configured to: when the data buffer identifier receiving module 503 receives the first data buffer identifier, send the first data to the node.

The data processing module 504 is further configured to receive the first data from the first processor.

Figure 7:
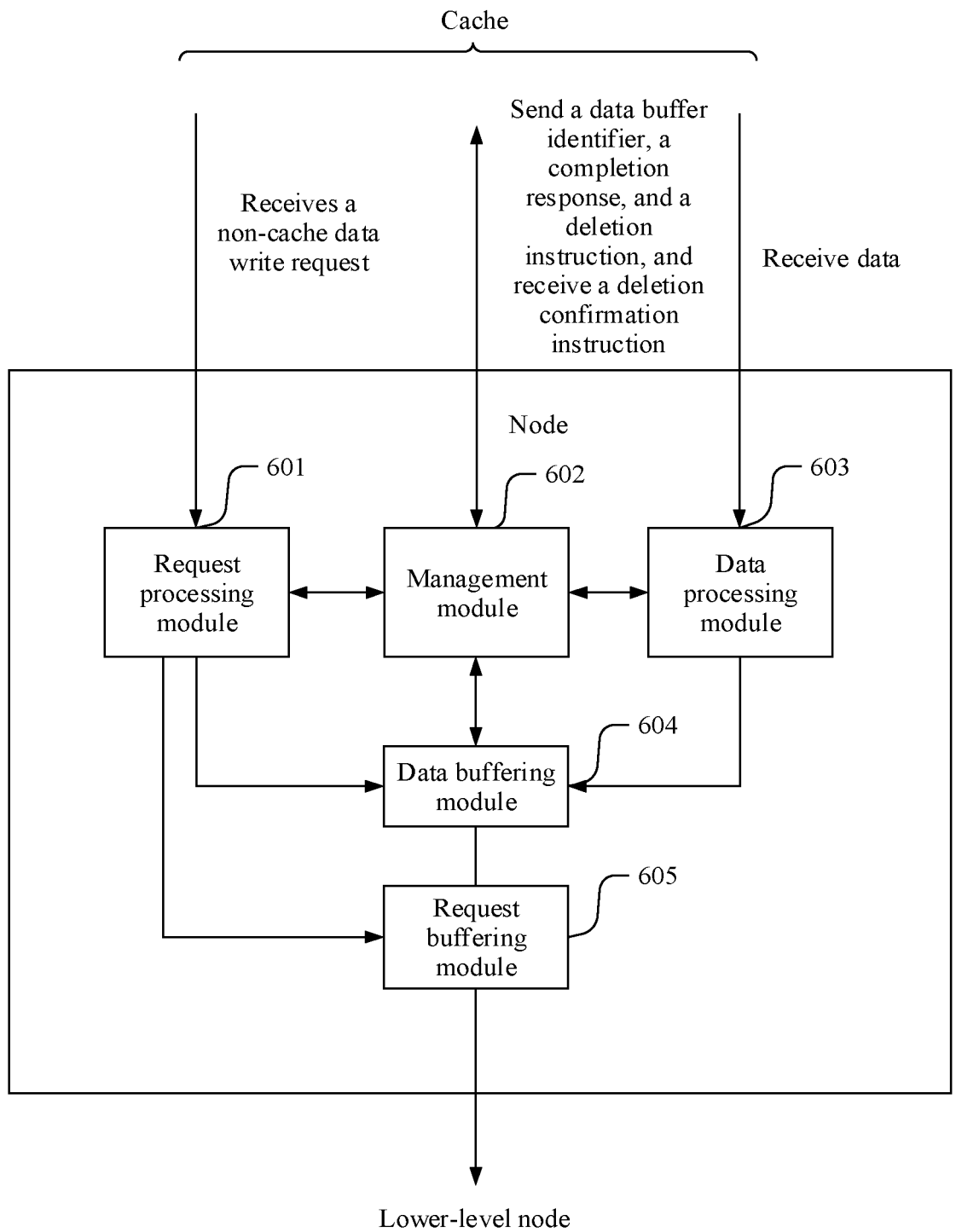
FIG. 7 is a schematic diagram of an embodiment of a node according to this application.

An embodiment of this application provides a node. Refer to FIG. 7. The node includes a request processing module 601, a management module 602, a data processing module 603, a data buffering module 604, and a request buffering module 605.

The request processing module 601 is separately connected to the data buffering module 604 and the request buffering module 605. The request processing module 601 is configured to: receive a non-cache data write request from a cache, and send the request to the data buffering module 604 and the request buffering module 605. The data buffering module 604 is configured to allocate a data buffer identifier based on the non-cache data write request, and the request buffering module 605 is configured to store the non-cache data write request. The management module 602 interworks with the data buffering module 604. After the data buffering module 604 allocates the data buffer identifier, the management module 602 may send the data buffer identifier to the cache. The management module 602 is configured to send the data buffer identifier, a completion response, and a deletion instruction to the cache. The management module 602 is further configured to receive a deletion confirmation instruction from the cache. The management module 602 interworks with the request processing module 601 and the data processing module 603. The data processing module 603 is configured to receive data from the cache and send the data to the data buffering module 604. The data buffering module 604 stores the data in a buffer. The data buffering module 604 and the request buffering module 605 may also write the data to a lower-level node based on the stored data and the stored non-cache data write request.

Specifically, functions of the modules in the node are as follows.

The request processing module 601 is configured to receive a first non-cache data write request from a first cache, where the first non-cache data write request includes a first address.

The request processing module 601 is further configured to receive a second non-cache data write request from the first cache, where the second non-cache data write request includes the first address.

The request processing module 601 is further configured to receive a third non-cache data write request from a second cache, where the third non-cache data write request includes the first address, and the second cache is different from the first cache.

The management module 602 is configured to determine that a correspondence between an identifier of the first cache and the first address is stored, where the correspondence indicates that the first address stored in the cache is marked with an exclusive flag.

The management module 602 is further configured to store the correspondence between the identifier of the first cache and the first address.

The management module 602 is further configured to send a third data buffer identifier and a second completion response to the first cache, where the second completion response includes the exclusive flag.

The management module 602 is further configured to: when determining that the correspondence between the identifier of the first cache and the first address is stored, send the deletion instruction to the first cache, where the deletion instruction instructs the first cache to delete the exclusive flag of the first address and send the deletion confirmation instruction to the node.

The management module 602 is further configured to receive the deletion confirmation instruction from the cache.

The management module 602 is further configured to delete the stored correspondence between the identifier of the first cache and the first address according to the deletion confirmation instruction.

The data processing module 603 is configured to receive first data corresponding to the first non-cache data write request.

The data buffering module 604 is configured to: allocate a first data buffer identifier to a first processor based on the first non-cache data write request received by the request processing module, and indicate the management module to send the first data buffer identifier to the first cache.

The data buffering module 604 is further configured to: when the data processing module receives the first data corresponding to the first non-cache data write request, write the first data into a data buffer corresponding to the first data buffer identifier, where the first data is obtained from the first processor when the first cache determines that the first address is stored in the first cache.

The data buffering module 604 is further configured to allocate the third data buffer identifier based on the second non-cache data write request received by the request processing module.

It should be noted that, in this application, the cache may be a shared cache, for example, an L3 cache; and the node may be a storage controller, a bus controller, or the like. Because the cache and the node are mainly implemented by a hardware circuit, various modules (for example, the management module 501, the flag storage module 502, the data buffer identifier receiving module 503, the data processing module 504, the request processing module 601, the management module 602, the data processing module 603, the data buffering module 604, the request buffering module 605, and the like) included in the cache and the node in the foregoing embodiments are all circuit modules. It is easy for persons skilled in the art to design a corresponding circuit structure after understanding a function of the circuit module. Therefore, structures of the circuit modules are not further described in this application.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for processing a non-cache data write request and performed by a cache, wherein the method comprises:
   receiving, from a first processor, a first non-cache data write request that comprises a first address;
   sending the first non-cache data write request to a node to apply to the node for a first data buffer identifier corresponding to the first address;
   receiving the first data buffer identifier from the node;
   determining whether the cache stores the first address;
   obtaining, from the first processor and when the cache stores the first address, first data corresponding to the first non-cache data write request; and
   sending, responsive to receiving the first data buffer identifier from the node, the first data to the node.

2. The method of claim 1, wherein obtaining the first data comprises:
   sending a second data buffer identifier to the first processor to instruct the first processor to send the first data to the cache, wherein the second data buffer identifier is allocated by the cache to the first processor based on the first non-cache data write request; and
   receiving the first data from the first processor.

3. The method of claim 2, wherein the method further comprises:
   determining that the first address is marked with an exclusive flag; and
   sending a first completion response to the first processor to instruct the first processor to release a buffer occupied by the first data.

4. The method of claim 3, wherein the method further comprises:
   receiving, from the node, a deletion instruction;
   deleting the exclusive flag of the first address; and
   sending a deletion confirmation instruction to the node.

5. The method of claim 3, wherein before receiving the first non-cache data write request, the method further comprises:
   receiving, from a second processor, a second non-cache data write request that comprises the first address;
   sending the second non-cache data write request to the node to cause the node to determine whether the first address is marked with the exclusive flag;
   receiving, from the node, a third data buffer identifier and a second completion response that comprises the exclusive flag; and
   marking, when the first address is not marked with the exclusive flag, the first address with the exclusive flag.

6. The method of claim 5, wherein the first processor is the same processor as the second processor.

7. The method of claim 5, wherein the first processor is a different processor than the second processor.

8. A cache, comprising:
   a memory configured to store a computer program; and
   a processor coupled to the memory and configured to invoke the computer program to cause the cache to:
      receive, from a first processor, a first non-cache data write request that comprises a first address;
      send, to a node, the first non-cache data write request to apply to the node for a first data buffer identifier corresponding to the first address;
      receive the first data buffer identifier from the node;
      determine whether the cache stores the first address;
      obtain, when the cache stores the first address and from the first processor, first data corresponding to the first non-cache data write request; and
      send, responsive to receiving the first data buffer identifier from the node, the first data to the node.

9. The cache of claim 8, wherein when invoked by the processor, the computer program further causes the cache to:
   send a second data buffer identifier to the first processor to instruct the first processor to send the first data to the cache, wherein the second data buffer identifier is allocated by the cache to the first processor based on the first non-cache data write request; and
   receive the first data from the first processor.

10. The cache of claim 9, wherein when invoked by the processor, the computer program further causes the cache to:
   determine that the first address stored in the cache is marked with an exclusive flag; and
   send, to the first processor, a first completion response to instruct the first processor to release a buffer occupied by the first data.

11. The cache of claim 10, wherein when executed by the processor, the computer program further causes the cache to:
   receive a deletion instruction from the node;
   delete the exclusive flag; and
   send a deletion confirmation instruction to the node.

12. The cache of claim 10, wherein when invoked by the processor, the computer program further causes the cache to, before the cache receives the first non-cache data write request from the first processor:
- receive, from a second processor, a second non-cache data write request that comprises the first address;
- send the second non-cache data write request to the node to cause the node to determine whether the first address is marked with the exclusive flag;
- receive, from the node, a third data buffer identifier and a second completion response that comprises the exclusive flag; and
- mark, when the first address is not marked with the exclusive flag, the first address with the exclusive flag.

13. The cache of claim 12, wherein the first processor is a different processor than the second processor.

14. A computer program product comprising instructions that are stored on a computer-readable medium and that, when executed by a processor, cause a cache to:
- receive, from a first processor, a first non-cache data write request that comprises a first address;
- send, to a node, the first non-cache data write request to apply to the node for a first data buffer identifier corresponding to the first address;
- receive the first data buffer identifier from the node;
- determine whether the cache stores the first address;
- obtain, when the cache stores the first address and from the first processor, first data corresponding to the first non-cache data write request; and
- send, by the responsive to receiving the first data buffer identifier from the node, the first data to the node.

15. The computer program product of claim 14, wherein when executed by the processor, the instructions further cause the cache to:
- send, to the first processor, a second data buffer identifier to instruct the first processor to send the first data to the cache, wherein the second data buffer identifier is allocated by the cache to the first processor based on the first non-cache data write request; and
- receive the first data from the first processor.

16. The computer program product of claim 15, wherein when executed by the processor, the instructions further cause the cache to:
- determine that the first address is marked with an exclusive flag; and
- send, to the first processor, a first completion response to instruct the first processor to release a buffer occupied by the first data.

17. The computer program product of claim 16, wherein when executed by the processor, the instructions further cause the cache to:
- receive a deletion instruction from the node;
- delete the exclusive flag; and
- send a deletion confirmation instruction to the node.

18. The computer program product of claim 16, wherein when executed by the processor, the instructions are further configured to cause the cache to before receiving the first non-cache data write request from the first processor:
- receive, from a second processor, a second non-cache data write request that comprises the first address;
- send, to the node, the second non-cache data write request to cause the node to determine whether the first address stored in the cache is marked with the exclusive flag;
- receive, from the node, a third data buffer identifier and a second completion response that comprises the exclusive flag; and
- mark, when the first address is not marked with the exclusive flag, the first address with the exclusive flag.

19. The computer program product of claim 18, wherein the first processor is the same processor as the second processor.

20. The computer program product of claim 18, wherein the first processor is a different processor than the second processor.

* * * * *

UNITED STATES PATENT AND TRADEMARK OFFICE
CERTIFICATE OF CORRECTION

| | | |
|---|---|---|
| PATENT NO. | : 11,789,866 B2 | |
| APPLICATION NO. | : 17/749612 | |
| DATED | : October 17, 2023 | |
| INVENTOR(S) | : Wenyu Wu, Jing Xia and Hengchao Xin | |

It is certified that error appears in the above-identified patent and that said Letters Patent is hereby corrected as shown below:

In the Claims

Claim 10, Column 16, Line 58: "determine that the first address stored in the cache is" should read "determine that the first address is"

Claim 14, Column 17, Line 31: "send, by the responsive to receiving the first data buffer" should read "send, responsive to receiving the first data buffer"

Claim 18, Column 18, Line 19: "configured to cause the cache to before receiving the first" should read "configured to cause the cache to, before receiving the first"

Claim 18, Column 18, Line 25: "stored in the cache is marked with the exclusive flag;" should read "is marked with the exclusive flag;"

Signed and Sealed this
Fifth Day of December, 2023

Katherine Kelly Vidal
*Director of the United States Patent and Trademark Office*